(12) United States Patent
Yang et al.

(10) Patent No.: US 10,362,604 B2
(45) Date of Patent: Jul. 23, 2019

(54) MULTI-USER MULTIPLE-INPUT MULTIPLE-OUTPUT REVERSE DIRECTION DURATION COMMUNICATIONS

(71) Applicant: Intel IP Corporation, Santa Clara, CA (US)

(72) Inventors: Ou Yang, Santa Clara, CA (US); Oren Kedem, Modiin Maccabim-Reut (IL); Chittabrata Ghosh, Freemont, CA (US); Solomon Trainin, Haifa (IL); Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/393,408

(22) Filed: Dec. 29, 2016

(65) Prior Publication Data

US 2018/0020480 A1 Jan. 18, 2018

Related U.S. Application Data

(60) Provisional application No. 62/380,672, filed on Aug. 29, 2016, provisional application No. 62/363,596, filed on Jul. 18, 2016.

(51) Int. Cl.
| | |
|---|---|
| *H04W 74/08* | (2009.01) |
| *H04B 7/0452* | (2017.01) |
| *H04W 72/04* | (2009.01) |
| *H04L 1/16* | (2006.01) |
| *H04W 84/12* | (2009.01) |

(52) U.S. Cl.
CPC ...... *H04W 74/0816* (2013.01); *H04B 7/0452* (2013.01); *H04L 1/1664* (2013.01); *H04L 1/1685* (2013.01); *H04W 72/042* (2013.01); *H04W 72/0446* (2013.01); *H04L 1/1628* (2013.01); *H04W 84/12* (2013.01)

(58) Field of Classification Search
CPC .................. H04W 74/0816; H04B 7/0452
See application file for complete search history.

(56) References Cited

U.S. PATENT DOCUMENTS

| | | | |
|---|---|---|---|
| 9,232,502 B2* | 1/2016 | Zhu | H04W 74/0816 |
| 10,063,359 B2* | 8/2018 | Kim | H04L 5/0055 |
| 2005/0075130 A1* | 4/2005 | Godfrey | H04W 16/14 |
| | | | 455/552.1 |
| 2006/0268886 A1* | 11/2006 | Sammour | H04W 28/18 |
| | | | 370/394 |
| 2007/0191052 A1* | 8/2007 | Kneckt | H04W 52/04 |
| | | | 455/522 |
| 2010/0176929 A1* | 7/2010 | Ozdemir | H04W 74/06 |
| | | | 340/10.4 |
| 2010/0329195 A1* | 12/2010 | Abraham | H04W 52/42 |
| | | | 370/329 |

(Continued)

*Primary Examiner* — Jean B Corrielus
(74) *Attorney, Agent, or Firm* — Eversheds Sutherland (US)

(57) ABSTRACT

This disclosure describes systems, methods, and devices related to reverse direction duration. A device may establish a multi-user multiple-input multiple-output (MU-MIMO) communication with one or more station devices. The device may determine a frame to be sent to the one or more station devices, wherein the frame includes at least one of a duration field or a reverse direction indication. The device may cause to send the frame to the one or more station devices.

11 Claims, 6 Drawing Sheets

(56) References Cited

U.S. PATENT DOCUMENTS

| | | | | |
|---|---|---|---|---|
| 2011/0286402 A1* | 11/2011 | Gong | ............ | H04L 1/1685 |
| | | | | 370/329 |
| 2012/0076073 A1* | 3/2012 | Merlin | ............ | H04W 74/0816 |
| | | | | 370/328 |
| 2012/0155424 A1* | 6/2012 | Kim | ............ | H04L 5/0037 |
| | | | | 370/330 |
| 2013/0034061 A1* | 2/2013 | Xie | ............ | H04W 72/1284 |
| | | | | 370/329 |
| 2013/0155931 A1* | 6/2013 | Prajapati | ............ | H04W 72/044 |
| | | | | 370/311 |
| 2013/0188567 A1* | 7/2013 | Wang | ............ | H04L 5/0023 |
| | | | | 370/329 |
| 2013/0250904 A1* | 9/2013 | Kang | ............ | H04B 7/0452 |
| | | | | 370/329 |
| 2015/0146654 A1* | 5/2015 | Chu | ............ | H04W 72/1289 |
| | | | | 370/329 |
| 2016/0164800 A1* | 6/2016 | Eitan | ............ | H04L 47/80 |
| | | | | 370/389 |
| 2016/0323426 A1* | 11/2016 | Hedayat | ............ | H04W 28/0268 |
| 2017/0034823 A1* | 2/2017 | Cariou | ............ | H04W 72/12 |
| 2017/0187435 A1* | 6/2017 | Cariou | ............ | H04B 7/0452 |
| 2017/0201956 A1* | 7/2017 | Huang | ............ | H04W 56/0005 |
| 2017/0290045 A1* | 10/2017 | Nair | ............ | H04B 7/0452 |
| 2017/0303328 A1* | 10/2017 | Cariou | ............ | H04W 76/025 |
| 2018/0007712 A1* | 1/2018 | Lou | ............ | H04W 74/006 |

* cited by examiner

MULTI-USER MULTIPLE-INPUT MULTIPLE-OUTPUT REVERSE DIRECTION DURATION COMMUNICATIONS

CROSS-REFERENCE TO RELATED APPLICATIONS

This application claims the benefit of U.S. Provisional Application No. 62/363,596 filed Jul. 18, 2016, and U.S. Provisional Application No. 62/380,672 filed Aug. 29, 2016, the disclosure of which are incorporated herein by reference as if set forth in full.

TECHNICAL FIELD

This disclosure generally relates to systems and methods for wireless communications and, more particularly, to multi-user multiple-input multiple-output (MU-MIMO) reverse direction (RD) duration.

BACKGROUND

Wireless devices are becoming widely prevalent and are increasingly requesting access to wireless channels. The growing density of wireless deployments requires increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

DETAILED DESCRIPTION

Figure 1:
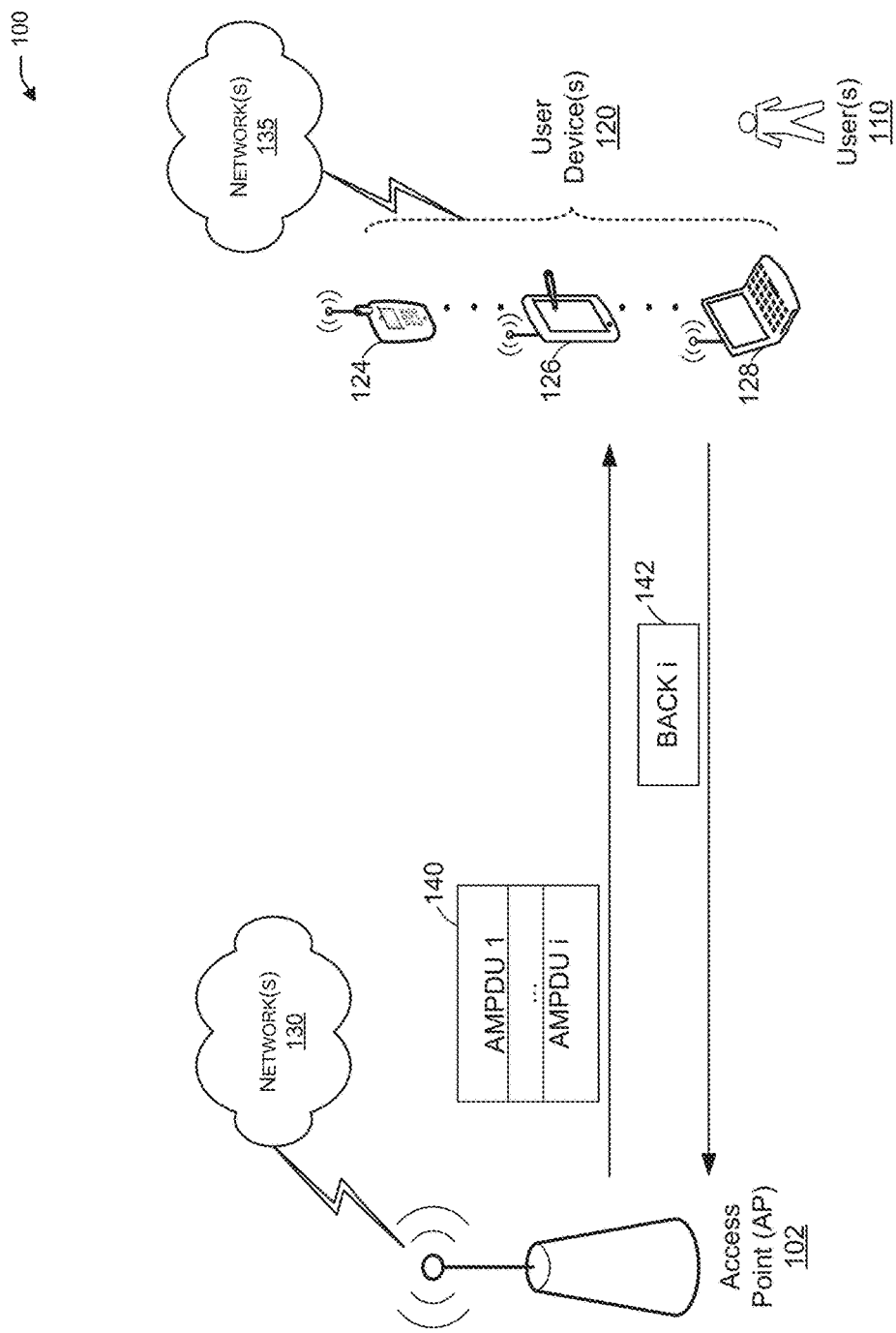
FIG. 1 depicts a network diagram illustrating an example network environment for a multi-user multiple-input multiple-output (MU-MIMO) reverse direction (RD) duration system, in accordance with one or more example embodiments of the present disclosure.

Example embodiments described herein provide certain systems, methods, and devices for a reverse direction (RD) duration configuration for multi-user multiple-input multiple-output (MU-MIMO) communication. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or access points or other devices capable of communicating in accordance with a communication standard, including but not limited to IEEE 802.11ad and/or IEEE 802.11ay.

The IEEE 802.11ac standard supports downlink (DL) MU-MIMO. However, reverse direction (RD) is not enabled for IEEE 802.11ac MU-MIMO transmissions. The IEEE 802.11ax standard also supports DL MU-MIMO, but the uplink traffic is sent using uplink (UL) MU-MIMO, which is different from IEEE 802.11ay.

Currently, there is no support for enabling RD for MU-MIMO communications, where a device may be simultaneously communicating with multiple devices such that the DL communication is from one to many and the UL communications are from many to one. Further, no solution exists for setting an RD duration for devices communicating in the reverse direction.

Example embodiments of the present disclosure relate to systems, methods, and devices for RD duration for MU-MIMO communication.

Directional multi-gigabit (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks.

Enabling reverse direction communication for MU-MIMO may increase the uplink channel access efficiency. It may improve throughput, and significantly improve the user experience in applications such as virtual reality where multiple players are MU-MIMO station devices (STAs), and the game console serves as the access point (AP) or a personal basic service set (PBSS) control point (PCP). Such applications require large DL bandwidth to support video quality, and at the same time require tight UL delay to guarantee prompt reaction to a user's motion.

In one embodiment, an MU-MIMO RD duration system may support RD for DL MU-MIMO transmissions. An MU-MIMO RD duration system may allow bi-directional communication between two or more devices during a transmit opportunity (TXOP) period by eliminating the need for either device to initiate a new data transfer. For example, during communications between an initiating device, such as an AP, and multiple responding devices (e.g., STAs), the multiple responding devices would be able to utilize the MU-MIMO RD duration system and send their data to the initiating device without having to go through channel access delay using, for example, a backoff timer to stay away from the channel while the channel is still busy. Without the RD MU-MIMO protocol, each unidirectional data transfer required each responding device to follow channel access delays in order to send its UL data. With RD, once the transmitting device has obtained a TXOP, it may grant permission to the other devices to send information back during the transmitting device's TXOP period. In this type of communication, two roles for each of the devices may be defined: an RD initiator and an RD responder. The RD initiator may send its permission to the RD responder to send its data in the reverse direction using, for example, a reverse direction grant (RDG). The RD responder may signal whether or not it will be sending data in the reverse direction.

In one embodiment, the MU-MIMO RD duration system may use MU-MIMO to deliver data from an RD initiator (e.g., an AP) to multiple RD responders (e.g., STAs), where an RDG may be signaled by the RD initiator to each of the RD responders. For example, the MU-MIMO RD duration system may utilize one or more multi-user physical layer convergence protocol data units (MU-PPDUs) that are addressed to the RD responders in order to signal to the RD responders using RDG that at least one of the RD responders is authorized to transmit data in the uplink direction during the same TXOP of the RD initiator.

In another embodiment, the MU-MIMO RD duration system may utilize a block acknowledgment request frame that may be aggregated with a quality of service (QoS) frame (e.g., QoS-Null frame). This may signal to an RD responder (using RDG) if it is authorized to transmit data in the uplink direction during the same TXOP of the RD initiator.

In one embodiment, the MU-MIMO RD duration system may utilize a block acknowledgment in order to respond to the RD initiator and in some cases to aggregate or otherwise piggyback RD data (also referred to as an RD responder burst) to the acknowledgment (e.g., a block acknowledgment (BACK) or an ACK). If the RD data traffic sent from the RD responder to the RD initiator requires a response, the RD initiator may send an acknowledgment to the RD responder.

In one embodiment, the MU-MIMO RD duration system may use the Duration/ID field of an MIMO frame to indicate an RD duration within which the RD responder is able to transmit its RD data. The MU-MIMO RD duration system may facilitate aligning the RD duration to the end of the TXOP. That is, the RD responder is authorized to transmit its RD data up to the end of the TXOP if the RD data does not require a response, or the RD responder is authorized to transmit its RD data and receive the response of its RD data if the RD data requires a response.

In another embodiment, the MU-MIMO RD duration system may use the Duration/ID field of an MIMO frame to set an RD duration within which the RD responder is able to transmit its RD data to the RD initiator device, where the RD duration is less than the TXOP. In this case, enough time is left for the RD initiator device to respond to the RD responder if a response is required and to collect block acknowledgments received from the rest of the devices that receive their corresponding MIMO frames sent from the RD initiator, after RD responder finishes responding to the RD initiator. That is, the RD initiator may allocate an RD duration that may be less than the TXOP duration allocated to the RD initiator.

In another embodiment, the MU-MIMO RD duration system may use a setup frame, which may be sent ahead of, or at the beginning of each MU-MIMO TXOP to announce the RD duration of each device. A setup frame may be a new frame generated in order to announce the RD duration for each device, or it may be an existing frame, such as a request to send (RTS) frame, or any other frame that may be sent from a transmitting device ahead of, or at the beginning of the TXOP that is allocated for that transmitting device. The setup frame may contain a fixed RD duration for all the addressed devices or one fixed RD duration for each addressed device.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for a multi-user multiple-input multiple-output (MU-MIMO) reverse direction (RD) duration system, in accordance with one or more example embodiments of the present disclosure. Wireless network 100 may include one or more user device(s) 120 and one or more access point(s) (AP) 102 or (PCP), which may communicate in accordance with IEEE 802.11 communication standards, such as the IEEE 802.11ad and/or the IEEE 802.11ay specifications. The user device(s) 120 may be referred to as stations (STAs). The user device(s) 120 may be mobile devices that are non-stationary and do not have fixed locations. Although the AP 102 is shown to be communicating on multiple antennas with the user devices 120, it should be understood that this is only for illustrative purposes and that any user device 120 may also communicate using multiple antennas with other user devices 120 and/or the AP 102.

Figure 4:
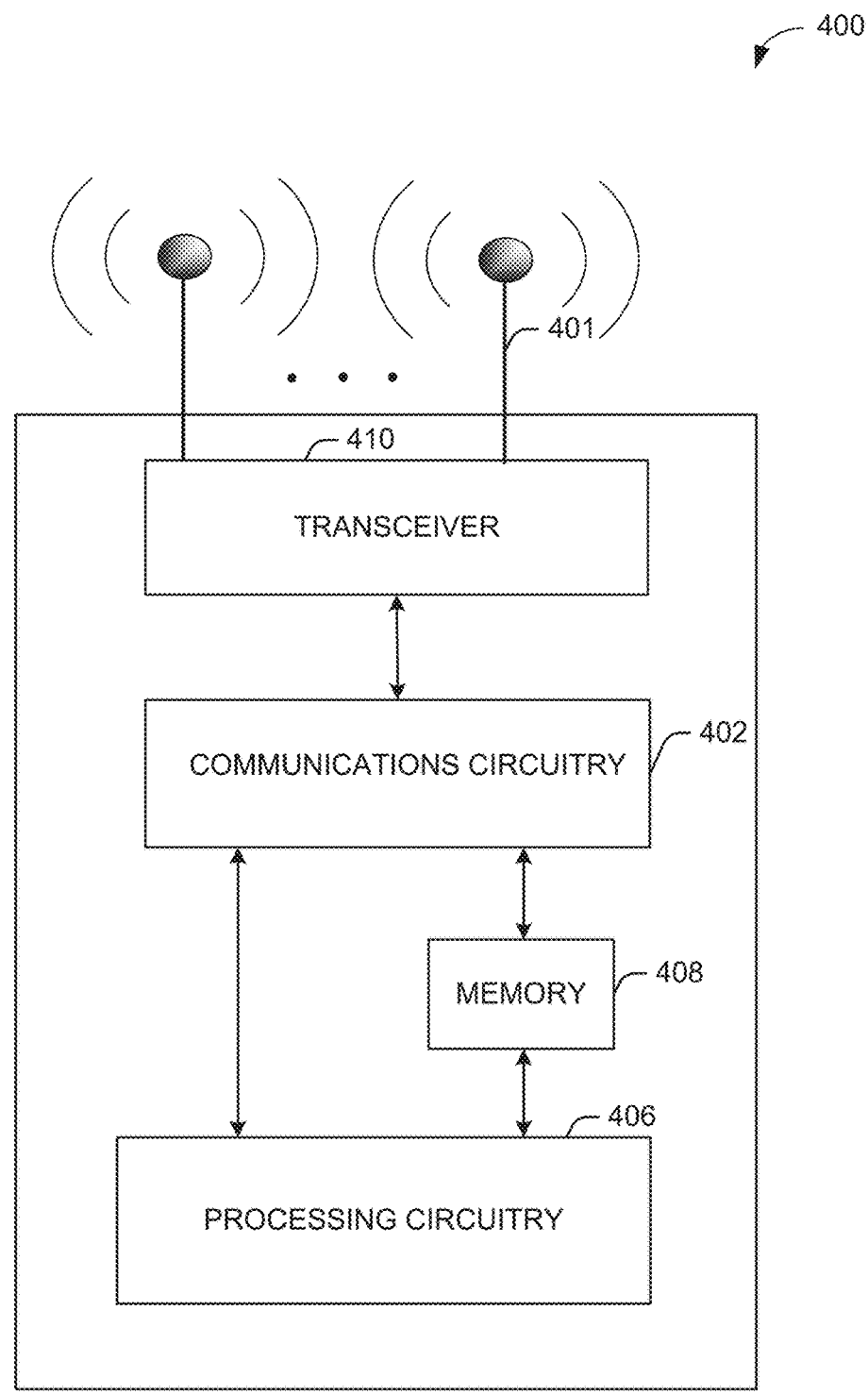
FIG. 4 illustrates a functional diagram of an example communication station that may be suitable for use as a user device, in accordance with one or more example embodiments of the present disclosure.
Figure 5:
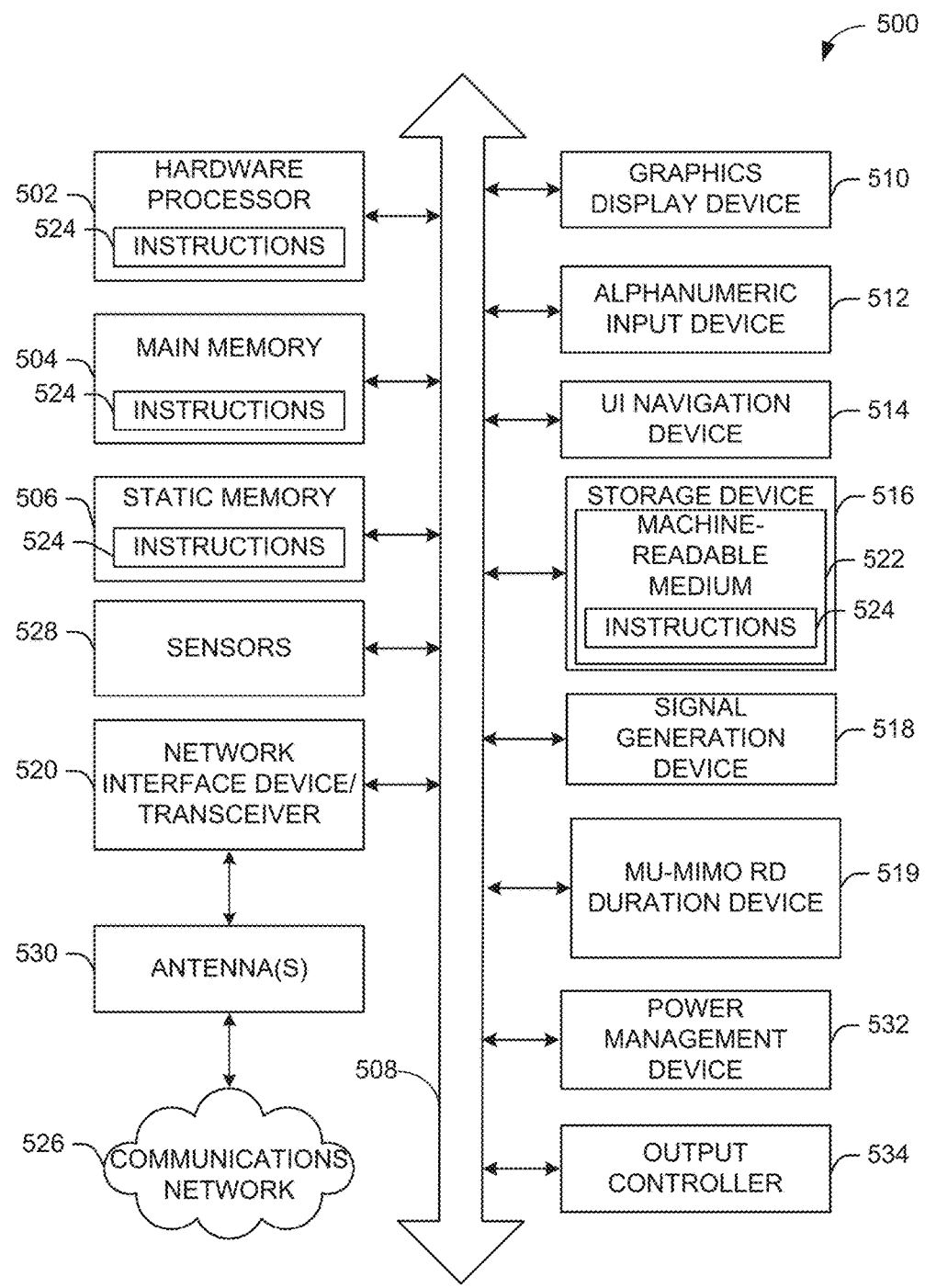
FIG. 5 is a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP 102 may be operable by one or more user(s) 110. In some embodiments, one or more illustrative user device(s) 120 and/or AP 102 may operate as a personal basic service set (PBSS) control point/access point (PCP/AP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)" as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

Media access control protocol data unit (MPDU) is a message (protocol data unit) exchanged between media access control (MAC) entities in a communication system based on the layered Open Systems Interconnection model. In systems where the MPDU may be larger than the MAC service data unit (MSDU), the MPDU may include multiple MSDUs as a result of packet aggregation. In systems where the MPDU is smaller than the MSDU, then one MSDU may generate multiple MPDUs as a result of packet segmentation.

An AMPDU is an aggregation of one or more MPDUs, which are information that is delivered as a unit among entities in a network and that may contain control information, such as address information or user data. One purpose for using an aggregated MPDU is to allow multiple MPDUs to be sent to the same receiving device concatenated in a single MPDU (e.g., AMPDU).

A physical layer convergence protocol (PLCP) data unit (PPDU) is an MPDU having an additional preamble and header in order to be a message at the PHY layer between peer entities in a communication system.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

In one embodiment, and with reference to FIG. 1, there is shown one or more aggregate MPDUs 140 (e.g., AMPDU 1 . . . AMPDU i, where i is a positive integer) that may be sent from a transmitting device (e.g., AP 102 (or PCP) and/or user device 120) to one or more receiving devices (e.g., AP 102 (or PCP) and/or user device 120), where these receiving devices belong to an MU-MIMO group with the transmitting device. At least one of these receiving devices may respond with a block acknowledgment (BACK) (e.g., BACKi 142) after receiving one of the MPDUs 140 destined for it. For example, AMPDUi may be sent to the user device 126 from the AP 102. After the AMPDUi is received by the user device 126, the user device 126 may respond back with an acknowledgment (e.g., BACKi 142).

For example, the AP 102 may be allocated a TXOP in order to access the channel. During that TXOP, the AP 102 is able to access the channel and communicate with one or more user devices that may be part of an MU-MIMO group with the AP 102. Devices other than the AP 102 would refrain from attempting to access the channel during the TXOP duration because of detecting that channel is busy and because the TXOP duration allocated to the AP 102 is known to these devices. However, a device may respond within a TXOP with an acknowledgment (e.g., BACK, or ACK) if instructed by the initiator device.

In one embodiment, an MU-MIMO RD duration system may facilitate setting the duration of reverse direction communication by a responder device based on an indication sent from the initiator device. For example, the AP 102 may indicate in a frame sent to at least one user device (e.g., the user device 126) that the user device is enabled to send back reverse direction data within the TXOP allocated to the AP 102. It is understood that the above descriptions are for purposes of illustration and are not meant to be limiting.

Figure 2:
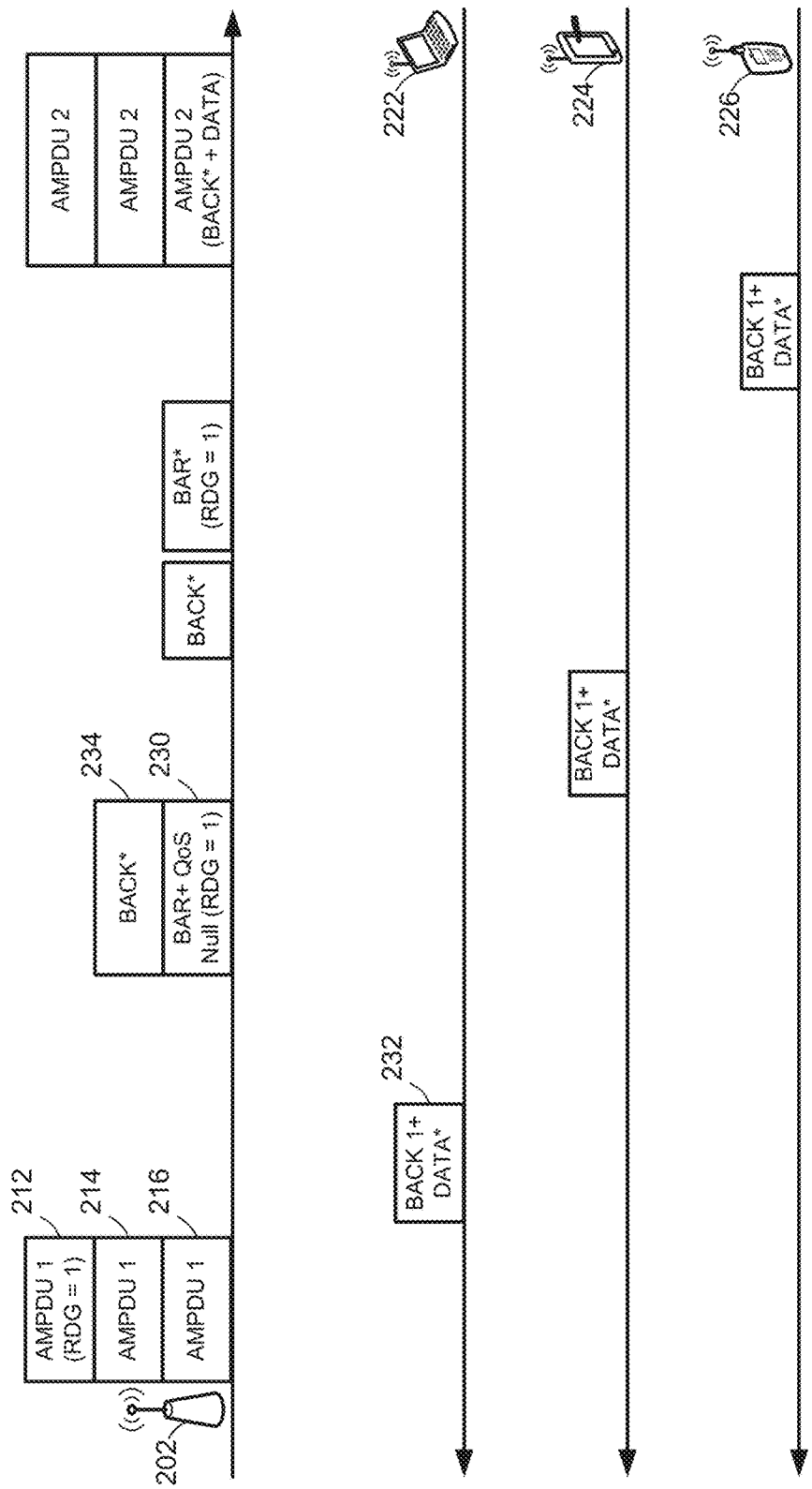
FIG. 2 depicts an illustrative schematic diagram for an MU-MIMO RD duration system, in accordance with one or more example embodiments of the present disclosure.

FIG. 2 depicts an illustrative schematic diagram for an MU-MIMO RD duration system, in accordance with one or more example embodiments of the present disclosure.

Referring to FIG. 2, there is shown an MU-MIMO communication between an AP 202 and three user devices (user devices 222, 224, and 226). The AP 202 may have been allocated a TXOP duration in order to transmit its data packets (e.g., frames 212, 214, and 216) in MU-MIMO fashion (e.g., simultaneously) to the user devices. For example, the AP 202 may send the frame 212 to the user device 222, the frame 214 to user device 224, and frame 216 to the user device 226. The AP 202 may request an acknowledgment from each of the three user devices (e.g., BACK or ACK). It should be understood that although an AP is shown in FIG. 2, a PCP may also be used.

In one embodiment, the MU-MIMO RD duration system may facilitate an AP/PCP 202 to enable RD for MU-MIMO devices. In this example, the AP 202 may have set RDG=1 in the frame 212 in order to indicate to user device 222 that it is enabled to send its RD data to AP 202. The user device 222 may then respond to the AP 202 with its RD data aggregated with a block acknowledgment, as shown in frame 232. That is the user device 222 aggregates its RD data with a lock acknowledgment when responding to the frame 212. When the AP 202 receives the frame 232 from user device to 222, the AP 202 may send a block acknowledgment frame (e.g., BACK 234) in response to receiving frame 232 from the user device 222. The AP 202 may send the BACK 234 frame in a MU-MIMO fashion with another frame 230, where frame 230 is intended for user device 224. In this example, the RDG=1 is set in the frame 230. In fact, a BAR frame does not include an RDG field in its header. In order to carry an RDG field, an AP/PCP 202 may need to aggregate a BAR frame with a QoS-Null frame, which has an RDG field in its header, to form an A-MPDU, which is a message exchanged between MAC entities. For example, frame 230 may be an aggregation of a BAR frame and a QoS-Null frame, where the RDG field is set to 1.

In one embodiment, an MU-MIMO RD duration system may facilitate determining an RD duration within which an RD responder (e.g., user device 222) is able to transmit its RD data to an RD initiator (e.g., AP 202).

In one embodiment, the MU-MIMO RD duration system may use the Duration/ID field included in an MPDU frame, sent from the RD initiator to the RD responder, indicating the end of the TXOP. That is, the duration field is utilized as an RD duration, which the RD initiator aligns with the TXOP duration. Typically, the RD duration is indicated in a duration field of an MPDU sent from the RD initiator to the RD responder. In other words, the end of the RD period aligns with the end of the TXOP. In this option, an MPDU that is set to RDG=1 by the RD initiator has its duration field aligned with the end of TXOP, indicating the period that the RD responder is allowed to transmit its RD responder burst and to obtain the necessary acknowledgment from RD initiator, if required. For example, the AP 202 may utilize the duration field that may be present in the AMPDU 212, or the frame 230 in order to notify the user device 222 of the duration within which the user device 222 is able to transmit its RD data to the AP 202. A benefit of this option is that no additional overhead is introduced because the AP 202 utilizes an existing duration field to notify the user device 222 of the RD duration. However, since the user device 222 may occupy the remaining TXOP that was allocated to the AP 202, and since it has been notified to utilize the RD duration that aligns with the TXOP, no time may be left for the AP 202 to send any following BARs to other STAs (e.g., user devices 224 and 226) and collect the other STAs' Block-ACKs.

In another embodiment, the MU-MIMO RD duration system may use the Duration/ID field to indicate an RD duration, but does not align it with the TXOP. This may prevent an RD responder from taking over the entire TXOP duration to transmit any RD data that it may have. In effect, this may limit the RD duration in the RD grant frames (A-MPDU that has RDG=1, or an aggregated BAR and QoS Null with RDG=1), and hence enough time is kept for the RD initiator to request BlockACK from the rest of the STAs (e.g., user devices 224 and 226). This option may use the duration field of an MPDU that sets RDG=1 by the RD initiator to indicate how long an RD responder can transmit its RD responder burst (not including the acknowledgment an RD responder may expect from the AP/PCP). This duration ends sooner than the end of the current TXOP. A benefit of this option is that no overhead is introduced. The AP/PCP may collect the BlockACK for each corresponding MU PPDU, and the reverse direction is achieved without sacrificing MU efficiency. However, an EDMG STA that may not be part of the MU-MIMO group may receive the RD grant frame (e.g., an AMPDU frame with RDG=1 or a BAR aggregated with QoS Null frame with RDG=1) with a duration that does not align with the end of the TXOP. This EDMG STA may set and/or update its NAV accordingly. In this case, the EDMG STA may access the channel before the end of the TXOP because it received a duration information that is not aligned with the TXOP. This may cause interference with the MU-MIMO transmissions of the MU-MIMO group (e.g., AP 202 and user devices 222, 224, and 226).

In another embodiment, the MU-MIMO RD duration system may use other frames to indicate the RD duration without changing the duration field of the MPDU frame sent to the STAs. This will prevent confusion by the EDMG STAs that may inadvertently receive the MPDU. A benefit of this option is that the duration field of the MPDU (e.g., the RD grant frame) aligning with the current TXOP is not altered to indicate an RD duration. In this case, the RD initiator may indicate the RD duration of each MU-MIMO device included in the MU-MIMO group by using a setup frame. The setup frame may be sent by the RD initiator (e.g., the AP 202) to the MU-MIMO destination STAs (e.g., the user devices 222, 224, and 226) before or at the beginning of each TXOP duration. The setup frame may be configured to indicate the RD duration in two different ways.

In one embodiment, the MU-MIMO RD duration system may allocate the same fixed RD duration for all the MU-MIMO destination STAs for sending their RD responder burst if they are granted an RD opportunity. For example, the AP 202 may utilize a setup frame to indicate a fixed RD duration for the user devices 222, 224, and 226. In this case, one field of the RD responder burst time should be included in the setup frame, and will be used by all the STAs that are addressed by this frame. This may save overhead because only one field is required for all addressed STAs. However, this may limit the flexibility in the RD duration allocation, because some STAs may require shorter or longer RDs depending on their traffic type. For example, if the AP 202 allocates an RD duration of one second to each of the user devices 222, 224, and 226, the user device 222 may require a longer time to transmit its RD data to the AP 202 than the user device 226. In this case, additional RD duration allocations will be needed by the user device 222 in order to transmit the rest of its RD responder burst. In another embodiment, the MU-MIMO RD duration system may allocate for every MU-MIMO destination STA its own RD duration for sending an RD responder burst. Therefore, the setup frame may have one field of RD responder burst duration per STA, and may support up to a maximum MU-MIMO group size (e.g., eight STAs). This may give flexibility in setting the RD duration for each destination STA. However, this may require additional overhead in the setup frame to include the various RD durations for the corresponding destination STAs. The setup frame may be an RTS frame that may include a control trailer, or may be any other MAC frame that serves the purpose of setting up MU-MIMO communication between an RD initiator and MU-MIMO destination STAs. A benefit of this option is that the RD duration for DL MU-MIMO may be indicated and may avoid confusing EDMG STAs in the NAV setting by aligning the duration field of the RD grant frame with the current TXOP. In this case, the RD duration configuration is set per TXOP, not per MU PPDU. In other words, an MU-MIMO destination STA does not have the flexibility to have different RD durations for different MU PPDUs in the same TXOP. It should be understood that within one TXOP, there may be multiple transmissions (e.g., AMPDUs) from the RD initiator to the MU-MIMO destination STAs. It is understood that the above descriptions are for purposes of illustration and are not meant to be limiting.

It is understood that the above descriptions are for purposes of illustration and are not meant to be limiting.

Figure 3A:
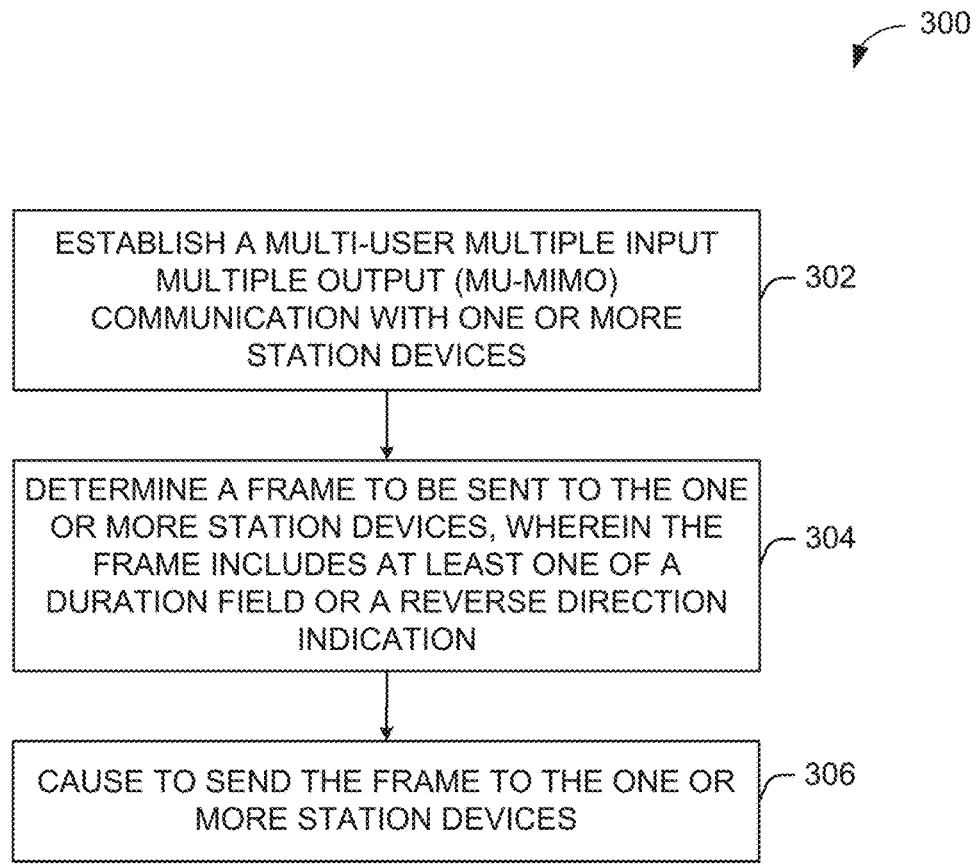
FIG. 3A depicts a flow diagram of an illustrative process for an MU-MIMO RD duration system, in accordance with one or more example embodiments of the present disclosure.

FIG. 3A illustrates a flow diagram of an illustrative process 300 for an MU-MIMO RD duration system, in accordance with one or more example embodiments of the present disclosure.

It should be noted that the actions taken by the AP may also be taken by the PCP. However, for ease of use, references are made to the actions of the AP.

At block 302, an RD initiator (e.g., the user device(s) 120 and/or the AP 102 of FIG. 1) may establish an MU-MIMO communication with one or more station devices. The MU-MIMO communication may comprise one or more devices that may communicate with each other. The RD initiator may simultaneously communicate with multiple devices such that the downlink communication is from one-to-many and the uplink communications are from many-to-one. The RD initiator may also choose to communicate sequentially to each of the one or more station devices. The RD initiator may be allocated a TXOP in order to access the communication channel. During that TXOP, the RD initiator is able to access the channel and communicate with one or more station devices that are part of the MU-MIMO group with the RD initiator. Devices other than the RD initiator would refrain from attempting to access the channel during the TXOP duration because of detecting that the channel is busy and because the TXOP duration allocated to the RD initiator is known to these devices. However, a station device belonging to the MU-MIMO communication is able to respond within that TXOP with an acknowledgment (e.g., BACK or ACK) if instructed by the RD initiator.

At block 304, the RD initiator may determine a frame to be sent to the one or more station devices, wherein the frame includes at least one of a duration field or a reverse direction indication. For example, the RD initiator may determine one or more MPDUs, aggregated or not, to be sent to the one or more station devices. These MPDUs may include a duration field associated with a TXOP duration, or may indicate to an RD responder that is enabled to send RD data, the RD duration within which an RD responder is able to transmit its RD data to the RD initiator. It should be understood that an RD responder is a device that has been enabled or authorized by the RD initiator to send back RD data during the TXOP that was allocated for the RD initiator. In addition, the RD initiator may send the permission to the RD responder to send its data in the reverse direction by setting, for example, a reverse direction grant (RDG), where the RDG may be signaled by the RD initiator to any RD responders. The RD initiator may utilize the MPDU or any other frame that is capable of setting the RDG to be equal to 1 indicating that the receiving device is an RD responder and that the RD responder is permitted to send any RD data that it may have in addition to the acknowledgment to the MPDU. The RD initiator may also utilize a block acknowledgment request frame that may be aggregated with a quality of service (QoS) frame (e.g., QoS-Null frame). This may signal to an RD responder (using RDG) if it is authorized to transmit data in the uplink direction during the same TXOP of the RD initiator.

At block 306, the RD initiator may cause to send the frame to the one or more station devices. For example, the RD initiator may send the frame, such that the frame may be received by devices including the one or more station devices belonging to the MU-MIMO group with the RD initiator. The RD initiator may request acknowledgment from each of the station devices that received the frame. If the RD initiator wants to permit one of the one or more station devices in the MU-MIMO group, the RD initiator may set the RDG=1 in one of the frames as described above, such that the frame is destined to the device that will be permitted to send its RD data in the reverse direction.

The RD initiator may use the Duration/ID field of an MIMO frame to indicate an RD duration within which the RD responder is able to transmit its RD data. The RD initiator may set the RD duration to align with the end of the TXOP duration. That is, the RD initiator permits the RD responder to transmit its RD data up to the end of the TXOP. In another option, the RD initiator may use the duration field of an MIMO frame to set an RD duration within which the RD responder is able to transmit its RD data to the RD initiator device, where the RD duration is less than the TXOP. In this case, enough time is left for the RD initiator device to collect block acknowledgments received from the rest of the devices that receive their corresponding MIMO frames sent from the RD initiator, after the RD responder finisheds responding to the RD initiator. That is, the RD initiator may allocate an RD duration that may be less than the TXOP duration allocated to the RD initiator. Another option is that the RD initiator may use a setup frame, which may be sent ahead of, or at the beginning of each MU-MIMO TXOP to announce the RD duration of each device. A setup frame may be a new frame generated in order to announce the RD duration for each device, or it may be an existing frame, such as an RTS frame, or any other frame that may be sent from a transmitting device ahead of the TXOP that is allocated for that transmitting device. The setup frame may contain a fixed RD duration for all the addressed MU MIMO destination STAs or one RD duration per MU MIMO destination STA.

It is understood that the above descriptions are for purposes of illustration and are not meant to be limiting.

Figure 3B:
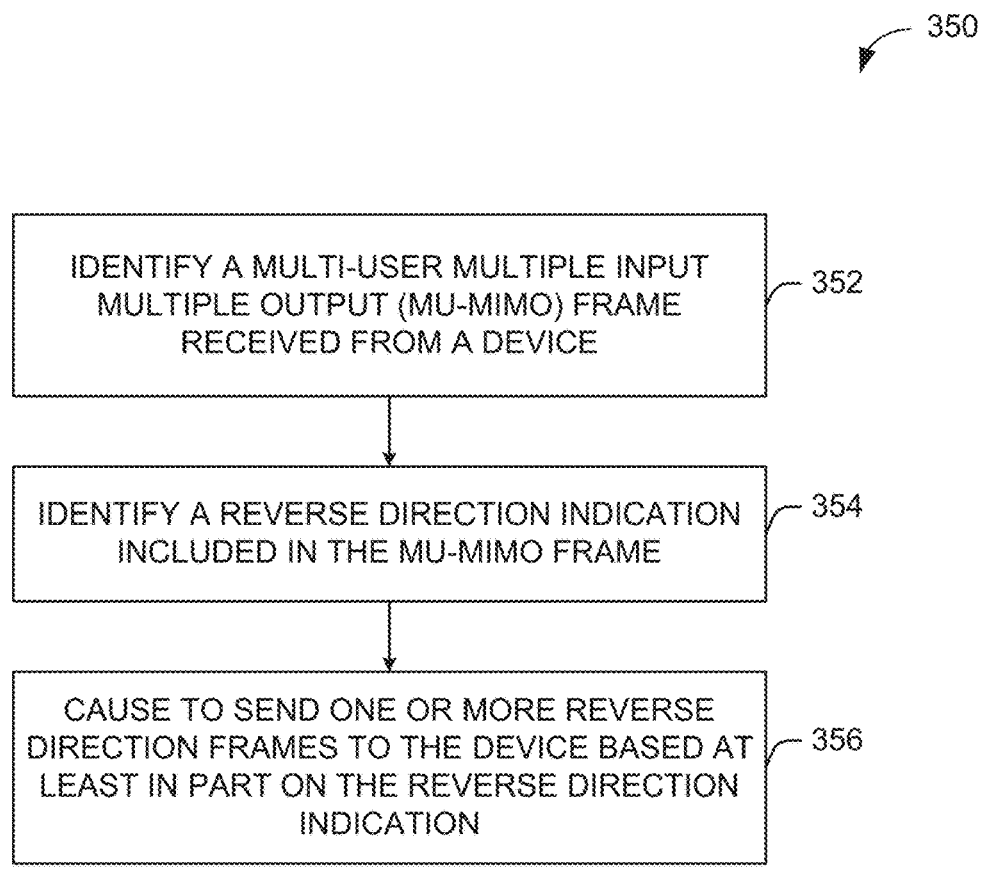
FIG. 3B depicts a flow diagram of an illustrative process for an MU-MIMO RD duration system, in accordance with one or more example embodiments of the present disclosure.

FIG. 3B illustrates a flow diagram of an illustrative process 350 for an MU-MIMO RD duration system, in accordance with one or more example embodiments of the present disclosure.

At block 352, a device (e.g., the user device(s) 120 and/or the AP 102 of FIG. 1) may identify an MU-MIMO frame received from a transmitting device. The transmitting device and the receiving device may be part of an MU-MIMO group. An RD initiator, such as an AP or a PCP or other devices, may establish an MU-MIMO communication with one or more user devices or other devices. For example, an AP may then send one or more frames to each of the user devices based on the communication. The MU-MIMO frame may be an MPDU frame, aggregator or not, that may be sent in an MIMO fashion (e.g., simultaneously) from the AP or may be sent sequentially from the AP to the one or more user devices.

At block 354, the device may identify a reverse direction indication included in the MU-MIMO frame. The AP may set the RDG to indicate to the device that the device is authorized to send data back to the AP during the TXOP assigned to the AP. Typically, devices cannot access the channel before the expiration of the TXOP. That is the AP owns the TXOP until its expiry. However, the AP may grant the TXOP to the device, which then can use the TXOP to transmit any RD data that it may have. The MU-MIMO frame may include information such as a TXOP duration that was allocated to the AP, or the AP may designate that duration to be a reverse direction duration that at least one of the one or more user devices will use to transmit its RD data within that RD duration. In one option, the AP may designate the RD duration to be aligned to the end of the TXOP duration. In that case, the device may understand in this duration that the device is allowed to transmit its RD data until the end of the TXOP. The AP may also set the duration field included in the MU-MIMO frame to a value that is less than the end of the TXOP duration. That is the duration field is set to not align with the end of the TXOP duration. In this case, the AP may set the duration to a duration that it wants to grant to the device to transmit its RD data. This may allow the AP to have enough time to communicate by sending and receiving frames to other devices in the MU-MIMO group. Since the AP may not know how much data the authorized device has to send to the AP, the device may or may not have enough time to transmit all of its RD data. However, the AP has more flexibility to control how long it wants to allocate a particular device to send its RD data. In another option, the AP may use other fields to set the RD durations for one or more devices in the MU-MIMO group. In this case, the AP may leave the duration field intact in the MPDU frame, which indicates the TXOP duration, in order not to confuse other devices that may have received the frame. The AP may indicate the RD duration for each device using another frame and/or field before the TXOP. In this case, the devices in the MU-MIMO group would know where to find the RD duration allocation, if there are any. In addition, the AP may allocate the RD duration to be fixed for all of the devices in the MU-MIMO group or may be one value for each devices in the MU-MIMO group. That is the AP may assign different RD durations to different devices based on their needs. For example, the AP may utilize a setup frame, which occurs before the TXOP transaction. This setup frame can be an RTS frame having a control trailer, which the AP may use to set the RD duration. The AP may also utilize any other MAC frame to indicate the RD duration. The purpose of this MAC frame is to notify the devices in the MU-MIMO group that the RD duration is either one fixed value for all devices or one fixed value for each device At block 356, the device may cause to send one or more reverse direction frames to the RD initiator (e.g., the AP) based at least in part on the reverse direction indication. If the device was enabled to send RD data to the RD initiator, the device may determine the RD duration in any of the embodiments provided above. The device may transmit its RD data within the RD duration that was allocated to it. It is understood that the above descriptions are for purposes of illustration and are not meant to be limiting.

FIG. 4 shows a functional diagram of an exemplary communication station 400 in accordance with some embodiments. In one embodiment, FIG. 4 illustrates a functional block diagram of a communication station that may be suitable for use as an AP 102 (FIG. 1) or user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or media access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in FIGS. 1, 2, 3A and 3B.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), an MU-MIMO RD duration device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The MU-MIMO RD duration device 519 may carry out or perform any of the operations and processes (e.g., the processes 300 and 350) described and shown above. For example, the MU-MIMO RD duration device 519 may support the RD for DL MU-MIMO transmissions. The MU-MIMO RD duration device 519 may allow bi-directional communication between two or more devices during a transmit opportunity (TXOP) period by eliminating the need for either device to initiate a new data transfer. For example, during communications between an initiating device, such as an AP, and multiple responding devices (e.g., STAs), the multiple responding devices would be able to utilize the MU-MIMO RD duration device 519 to send their data to the initiating device without having to go through channel access delay using, for example, a backoff timer to stay away from the channel while the channel is still busy. Without the RD MU-MIMO protocol, each unidirectional data transfer required each responding device to follow channel access delays in order to send its UL data. With RD, once the transmitting device has obtained a TXOP, it may grant permission to the other devices to send information back during the transmitting device's TXOP period. In this type of communication, two roles for each of the devices may be defined: an RD initiator and an RD responder. The RD initiator may send its permission to the RD responder to send its data in the reverse direction using, for example, a reverse direction grant (RDG). The RD responder may signal whether or not it will be sending data in the reverse direction.

The MU-MIMO RD duration device 519 may use MU-MIMO to deliver data from an RD initiator (e.g., an AP) to multiple RD responders (e.g., STAs), where an RDG may be signaled by the RD initiator to each of the RD responders. The MU-MIMO RD duration device 519 may utilize one or more multi-user physical layer convergence protocol data units (MU-PPDUs) that are addressed to the RD responders in order to signal to the RD responders using RDG that at least one of the RD responders is authorized to transmit data in the uplink direction during the same TXOP of the RD initiator.

The MU-MIMO RD duration device 519 may utilize a block acknowledgment request frame that may be aggregated with a quality of service (QoS) frame (e.g., QoS-Null frame). This may signal to an RD responder (using RDG) if it is authorized to transmit data in the uplink direction during the same TXOP of the RD initiator.

The MU-MIMO RD duration device 519 may utilize a block acknowledgment (BA) in order to respond to the RD initiator and in some cases to aggregate or otherwise piggyback RD data to the BA. If the RD data traffic sent from the RD responder to the RD initiator requires a response, the RD initiator may send the BA to the RD responder.

The MU-MIMO RD duration device 519 may facilitate one or more options to indicate an RD duration within which the RD responder is able to transmit its RD data. In one embodiment, a first option may be to use the duration field of an MIMO frame. The MU-MIMO RD duration device 519 may facilitate aligning the RD duration to the end of the TXOP. That is, the RD responder is authorized to transmit its RD data up to the end of the TXOP.

In one embodiment, a second option may be to use the duration field of an MIMO frame to set the RD duration within which the RD responder is able to transmit its RD data to the RD initiator device. In this case, enough time is left for the RD initiator device to collect block acknowledgments received from the rest of the devices that receive their corresponding MIMO frames sent from the RD initiator, after the RD responder finisheds responding to the RD initiator. That is, the RD initiator may allocate an RD duration that may be less than the TXOP duration allocated to the RD initiator.

In another embodiment, a third option may be to use a setup frame, which may be sent ahead of, or at the beginning of each MU-MIMO TXOP to announce the RD duration of each device. A setup frame may be a new frame generated in order to announce the RD duration for each device, or it may be an existing frame, such as a request to send (RTS) frame, or any other frame that may be sent from a transmitting device ahead of the TXOP that is allocated for that transmitting device. The setup frame may contain a fixed RD duration for all the addressed devices or one fixed value for each addressed device.

It is understood that the above are only a subset of what the MU-MIMO RD duration device 519 may be configured to perform and that other functions included throughout this disclosure may also be performed by the MU-MIMO RD duration device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to establish a multi-user multiple-input multiple-output (MU-MIMO) communication with one or more station devices. The memory and processing circuitry may be further configured to determine a frame to be sent to the one or more station devices, wherein the frame may include at least one of a duration field or a reverse direction indication. The memory and processing circuitry may be further configured to cause to send the frame to at least a first device of the one or more station devices.

The implementations may include one or more of the following features. The duration field may include a transmit opportunity (TXOP) duration or a reverse direction duration. The frame is a block acknowledgment request frame, an MU-MIMO data frame, or a setup frame. The memory and the processing circuitry are further configured to cause to send a second frame to a second device of the one or more station devices, wherein the second frame may include at least in part an indication to send reverse direction data. The reverse direction duration is allocated to be aligned with an end of the TXOP duration. The reverse direction duration is a fixed reverse direction duration for all the one or more station devices or a specific reverse direction duration for each of the one or more station devices. The setup frame is a request to send (RTS) frame. The block acknowledgment request is aggregated with a quality of service (QoS) Null. The memory and the processing circuitry are further configured to identify one or more reverse direction frames received from the first device of the one or more station devices. The memory and the processing circuitry are further configured to determine a remaining time of the TXOP allocated for the device, wherein the remaining time is based at least in part on the one or more reverse direction frames received from the first device. The device may further include a transceiver configured to transmit and receive wireless signals. The device may further include one or more antennas coupled to the transceiver.

According to example embodiments of the disclosure, there may be a device. The device may include memory and processing circuitry configured to identify a multi-user multiple-input multiple-output (MU-MIMO) frame received from a device. The memory and processing circuitry may be further configured to identify a reverse direction indication included in the MU-MIMO frame. The memory and processing circuitry may be further configured to cause to send one or more reverse direction frames to the device based at least in part on the reverse direction indication. The frame is a block acknowledgment request frame, an MU-MIMO data frame, or a setup frame. The memory and the processing circuitry are further configured to determine a reverse direction duration included in the frame. The reverse direction duration is allocated to be aligned with an end of a transmit opportunity (TXOP) duration, wherein the TXOP duration is associated with the device. The reverse direction duration is a fixed reverse direction duration assigned to a group of devices or a specific reverse direction duration assigned to a specific device.

According to example embodiments of the disclosure, there may be a non-transitory computer-readable medium storing computer-executable instructions which, when executed by a processor, cause the processor to perform operations. The operations may include identifying a frame received from a device. The operations may include identifying a reverse direction indication included in the frame. The operations may include causing to send one or more reverse direction frames to the device based at least in part on the reverse direction indication.

The implementations may include one or more of the following features. The frame is a block acknowledgment request frame, an MU-MIMO data frame, or a setup frame. The operations further comprise determining a reverse direction duration included in the frame. The reverse direction duration is allocated to be aligned with an end of a transmit opportunity (TXOP) duration, wherein the TXOP duration is associated with the device. The reverse direction duration is a fixed reverse direction duration assigned to a group of devices or a specific reverse direction duration assigned to a specific device.

According to example embodiments of the disclosure, there may be a non-transitory computer-readable medium storing computer-executable instructions which, when executed by a processor, cause the processor to perform operations. The operations may include establishing, by one or more processors, a multi-user multiple-input multiple-output (MU-MIMO) communication with one or more devices. The operations may include determining a frame to be sent to the one or more devices, wherein the frame may include a duration field and a reverse direction indication. The operations may include causing to send the frame to at least a first device of the one or more devices.

The implementations may include one or more of the following features. The duration field may include a TXOP duration or a reverse direction duration. The reverse direction duration is allocated to be aligned with an end of the TXOP duration. The frame is a block acknowledgment request frame, an MU-MIMO data frame, or a setup frame. The operations may further include causing to send a second frame to a second device of the one or more station devices, wherein the second frame may include at least in part an indication to send reverse direction data. The reverse direction duration is a fixed reverse direction duration for all the one or more station devices or a specific reverse direction duration for each of the one or more station devices. The setup frame is a request to send (RTS) frame. The block acknowledgment request is aggregated with a quality of service (QoS) Null. The operations may further include identifying one or more reverse direction frames received from the first device of the one or more station devices. The operations may further include determining a remaining time of the TXOP allocated for the device, wherein the remaining time is based at least in part on the one or more reverse direction frames received from the first device.

According to example embodiments of the disclosure, there may include a method. The method may include establishing, by one or more processors, a multi-user multiple-input multiple-output (MU-MIMO) communication with one or more devices. The method may include determining a frame to be sent to the one or more devices, wherein the frame includes a duration field and a reverse direction indication. The method may include causing to send the frame to at least a first device of the one or more devices.

The implementations may include one or more of the following features. The duration field includes a TXOP duration or a reverse direction duration. The reverse direction duration is allocated to be aligned with an end of the TXOP duration. The frame is a block acknowledgment request frame, an MU-MIMO data frame, or a setup frame. The method may further include causing to send a second frame to a second device of the one or more station devices, wherein the second frame includes at least in part an indication to send reverse direction data. The reverse direction duration is a fixed reverse direction duration for all the one or more station devices or a specific reverse direction duration for each of the one or more station devices. The setup frame is a request to send (RTS) frame. The block acknowledgment request is aggregated with a quality of service (QoS) Null. The method may further include identifying one or more reverse direction frames received from the first device of the one or more station devices. The method may further include determining a remaining time of the TXOP allocated for the device, wherein the remaining time is based at least in part on the one or more reverse direction frames received from the first device.

According to example embodiments of the disclosure, there may include a method. The method may include establishing, by one or more processors, a multi-user multiple-input multiple-output (MU-MIMO) communication with one or more devices. The method may include determining a frame to be sent to the one or more devices, wherein the frame includes a duration field and a reverse direction indication. The method may include causing to send the frame to at least a first device of the one or more devices.

The implementations may include one or more of the following features. The duration field includes a TXOP duration or a reverse direction duration. The reverse direction duration is allocated to be aligned with an end of the TXOP duration. The frame is a block acknowledgment request frame, an MU-MIMO data frame, or a setup frame. The method may further include causing to send a second frame to a second device of the one or more station devices, wherein the second frame includes at least in part an indication to send reverse direction data. The reverse direction duration is a fixed reverse direction duration for all the one or more station devices or a specific reverse direction duration for each of the one or more station devices. The setup frame is a request to send (RTS) frame. The block acknowledgment request is aggregated with a quality of service (QoS) Null. The method may further include identifying one or more reverse direction frames received from the first device of the one or more station devices. The method may further include determining a remaining time of the TXOP allocated for the device, wherein the remaining time is based at least in part on the one or more reverse direction frames received from the first device.

In example embodiments of the disclosure, there may be an apparatus. The apparatus may include means for establishing, by one or more processors, a multi-user multiple-input multiple-output (MU-MIMO) communication with one or more devices. The apparatus may include means for determining a frame to be sent to the one or more devices, wherein the frame includes a duration field and a reverse direction indication. The apparatus may include means for causing to send the frame to at least a first device of the one or more devices. The implementations may include one or more of the following features. The duration field includes a TXOP duration or a reverse direction duration. The reverse direction duration is allocated to be aligned with an end of the TXOP duration. The frame is a block acknowledgment request frame, an MU-MIMO data frame, or a setup frame. The apparatus may further comprise means for causing to send a second frame to a second device of the one or more station devices, wherein the second frame includes at least in part an indication to send reverse direction data. The reverse direction duration is a fixed reverse direction duration for all the one or more station devices or a specific reverse direction duration for each of the one or more station devices. The setup frame is a request to send (RTS) frame. The block acknowledgment request is aggregated with a quality of service (QoS) Null. The apparatus may further comprise means for identifying one or more reverse direction frames received from the first device of the one or more station devices. The apparatus may further comprise means for determining a remaining time of the TXOP allocated for the device, wherein the remaining time is based at least in part on the one or more reverse direction frames received from the first device.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for allocating a reverse direction to one or more station devices in an enhanced directional multi-gigabit (EDMG) downlink multiuser multiple-input multiple-output (MU-MIMO) communication, the device comprising:
    storage and processing circuitry configured to:
        determine a transmit opportunity (TXOP) allocated for the device;
        cause to send a first frame to a plurality of the one or more station devices, wherein the first frame includes a duration field, wherein the duration field is associated with the TXOP, wherein the first frame comprises a first subframe addressed to a first station device of the one or more station devices, and wherein the first subframe comprises a first indication of reverse direction;
        generate a downlink (DL) MU-MIMO aggregated frame by aggregating a block acknowledgment request (BAR) frame and a quality of service (QoS) null frame, wherein the QoS null frame includes a second indication of reverse direction, and wherein the DL MU-MIMO aggregated frame is addressed to a second station device of the one or more station devices;
        cause to send the DL MU-MIMO aggregated frame to the second station device; and
        identify a reverse direction data frame, based on at least one of the first indication of reverse direction or the second indication of reverse direction, received from at least one of the plurality of the one or more station devices.

2. The device of claim 1, wherein the duration field includes a reverse direction duration.

3. The device of claim 1, wherein the first indication of reverse direction indicates to the first station device to send its reverse direction data.

4. The device of claim 1, further comprising a transceiver configured to transmit and receive wireless signals.

5. The device of claim 4, further comprising one or more antennas coupled to the transceiver.

6. The device of claim 1, wherein the processing circuitry is further configured to determine the one or more devices support reverse direction.

7. The device of claim 1, wherein the second indication of reverse direction includes a reverse direction grant (RDG) field, a value of the RDG field being equal to 1 to indicate a grant of reverse direction duration.

8. A method comprising:
    determining, by one or more processors of a device for allocating a reverse direction to one or more station devices in an enhanced directional multi-gigabit (EDMG) downlink multiuser multiple-input multiple-output (MU-MIMO) communication, a transmit opportunity (TXOP) allocated for the device;
    causing to send a first frame to a plurality of the one or more devices, wherein the first frame includes a duration field, wherein the duration field is associated with the TXOP, wherein the first frame comprises a first subframe addressed to a first station device of the one or more station devices, and wherein the first subframe comprises a first indication of reverse direction;
    generating a downlink (DL) MU-MIMO aggregated frame by aggregating a block acknowledgment request (BAR) frame and a quality of service (QoS) null frame, wherein the QoS null frame includes a second indication of reverse direction, and wherein the DL MU- MIMO aggregated frame is addressed to a second station device of the one or more station devices;

causing to send the DL MU-MIMO aggregated frame to the second station device; and identifying a reverse direction data frame, based on at least one of the first indication of reverse direction or the second indication of reverse direction, received from at least one of the plurality of the one or more station devices.

9. The method of claim 8, wherein the duration field includes a reverse direction duration.

10. The method of claim 8, further comprising determining the one or more devices support reverse direction.

11. The method of claim 8, wherein to the first indication of reverse direction includes a reverse direction grant (RDG) field, a value of the RDG field being equal to 1 to indicate a grant of reverse direction duration.

\* \* \* \* \*